(12) United States Patent
Wang et al.

(10) Patent No.: US 12,111,769 B2
(45) Date of Patent: Oct. 8, 2024

(54) VALIDITY MAPPING TECHNIQUES

(71) Applicant: Micron Technology, Inc., Boise, ID (US)

(72) Inventors: Xing Wang, Shanghai (CN); Zhen Gu, Shanghai (CN); Xu Zhang, Shanghai (CN); Liping Xu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 234 days.

(21) Appl. No.: 17/630,453

(22) PCT Filed: Mar. 16, 2021

(86) PCT No.: PCT/CN2021/081140
§ 371 (c)(1),
(2) Date: Jan. 26, 2022

(87) PCT Pub. No.: WO2022/193143
PCT Pub. Date: Sep. 22, 2022

(65) Prior Publication Data
US 2023/0359563 A1   Nov. 9, 2023

(51) Int. Cl.
*G06F 12/0873*   (2016.01)
(52) U.S. Cl.
CPC ............... *G06F 12/0873* (2013.01)
(58) Field of Classification Search
None
See application file for complete search history.

(56) References Cited

U.S. PATENT DOCUMENTS

| | | | | |
|---|---|---|---|---|
| 9,075,708 | B1* | 7/2015 | Kang | G06F 12/0246 |
| 2020/0065241 | A1* | 2/2020 | Cho | G06F 12/0246 |
| 2020/0073819 | A1* | 3/2020 | Blake | G06F 12/1009 |
| 2020/0310987 | A1* | 10/2020 | Choi | G06F 12/1027 |

FOREIGN PATENT DOCUMENTS

| | | |
|---|---|---|
| CN | 105930278 A | 10/2015 |
| CN | 107066393 A | 1/2017 |
| CN | 112015672 A | 8/2020 |
| CN | 112416810 A | 11/2020 |

OTHER PUBLICATIONS

ISA/CN International Search Report and Written Opinion of the International Searching Authority, Int'l Appl. No. PCT/CN2021/081140, Dec. 22, 2021 (7 pgs).

* cited by examiner

*Primary Examiner* — Michael Alsip
(74) *Attorney, Agent, or Firm* — Holland & Hart LLP

(57) ABSTRACT

Methods, systems, and devices for validity mapping techniques are described. A memory device may use a change log to update a mapping that indicates whether data stored at respective physical addresses is valid. For example, the memory device may receive a command associated with data having a corresponding set of addresses (whether logical block addresses or physical addresses). The memory device may set an entry of the change log based on whether the set of addresses are consecutive. For example, the memory device may identify whether the set of addresses are consecutive and may set a flag in the entry of the change log to indicate whether the addresses are consecutive. Then, the memory device may update one or more entries of the mapping corresponding to the entry of the change log to indicate whether the addresses corresponding to the one or more entries of the mapping store valid data.

24 Claims, 5 Drawing Sheets

VALIDITY MAPPING TECHNIQUES

CROSS REFERENCE

The present Application for Patent is a 371 national phase filing of International Patent Application No. PCT/CN2021/081140 by Wang et al., entitled "VALIDITY MAPPING TECHNIQUES," filed Mar. 16, 2021, assigned to the assignee hereof, and expressly incorporated by reference herein.

FIELD OF TECHNOLOGY

The following relates generally to one or more systems for memory and more specifically to validity mapping techniques.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
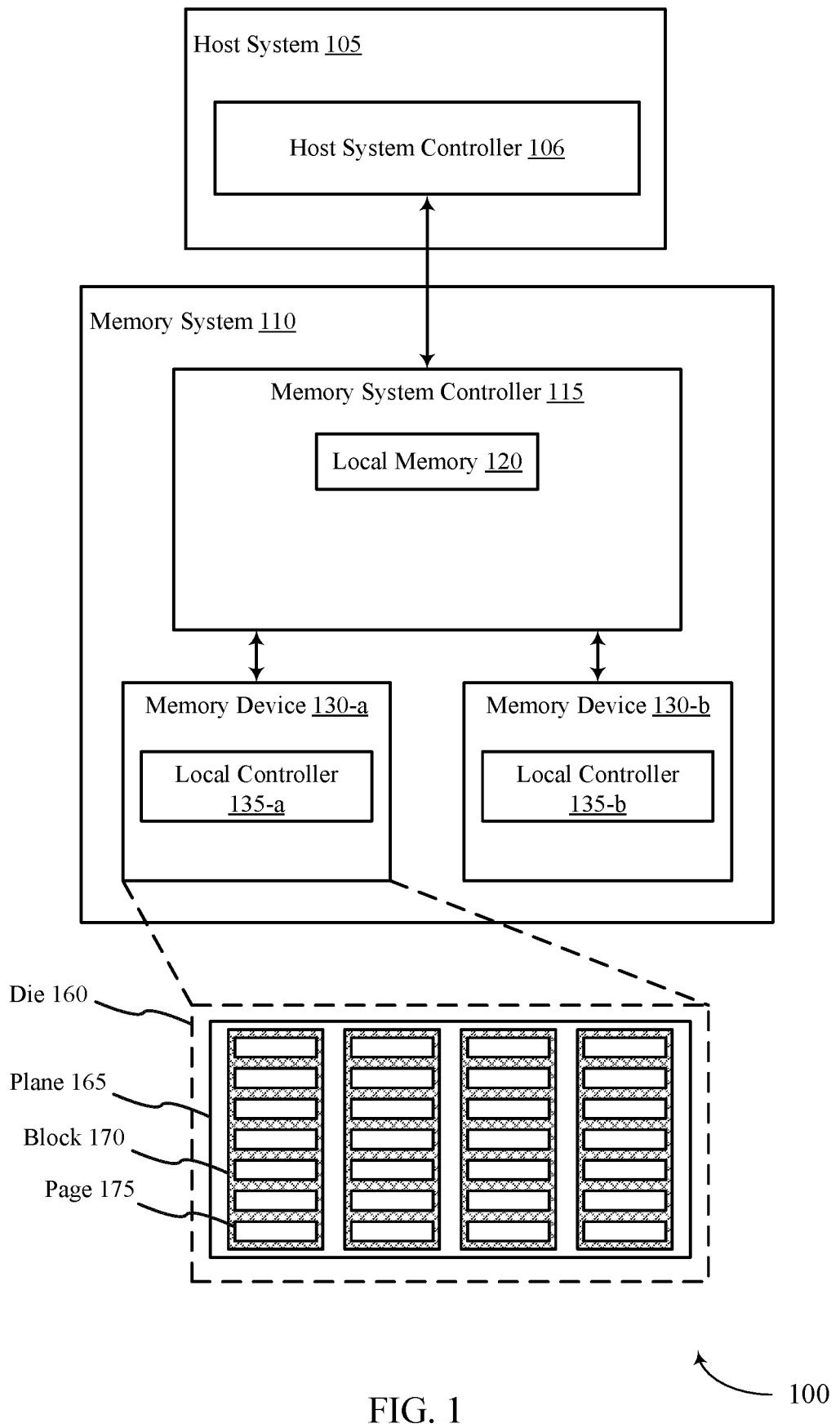
FIG. 1 illustrates an example of a system that supports validity mapping techniques in accordance with examples as disclosed herein.

Memory devices of a memory system may store data at a corresponding physical address, where a physical address may identify a physical location of a corresponding memory cell (e.g., or a page of memory cells) within a memory device. The physical location of data within the memory device may change over time due to the memory device accommodating the writing of additional data, maintenance operations performed by the memory device (e.g., garbage collection operations), or for other reasons. A host system coupled with the memory system may reference data (e.g., if issuing read, write, or other commands associated with the data) using logical addresses (e.g., logical block addresses (LBAs), virtual addresses, system addresses, or other logical addresses), and the memory device (e.g., or the memory system) may generate and maintain a mapping between the logical addresses used in the communications and the physical addresses of the memory cells at which the data is stored, which may support the memory device changing the physical addresses over time.

The memory system may additionally generate, maintain, and store a validity mapping that indicates whether data stored at physical addresses is valid. The memory system may use the validity mapping, for example, to determine which physical addresses are available to store data, among other operations. In some examples, updating the validity mapping may include loading and unloading portions of the validity mapping to a volatile memory device of the memory system. The memory system may use a change log to group updates to the validity mapping, thereby reducing latency associated with updating the validity mapping by reducing a quantity of times that portions of the validity mapping are loaded or unloaded from the volatile memory device. In some examples, the memory system may receive a command (e.g., a write command, an unmap command, or some other command associated with updating a validity mapping) associated with data having a corresponding set of physical addresses. In some cases, in response to receiving the command, the memory system may add, for each physical address of the set of physical addresses, an entry to the change log that indicates an update to a corresponding entry of the validity mapping that is associated with the physical address. The memory system may then update the corresponding entries of the validity mapping according to the updates indicated by the entries of the change log. In some cases, however, the change log may have size restrictions, which may limit a quantity of updates to the validity mapping that may be grouped by the change log. Accordingly, techniques to increase a quantity of updates to the validity mapping that may be grouped by a change log may reduce latency and increase performance associated with updating validity mappings.

Techniques, systems, and devices are described herein for increasing performance and reducing latency associated with maintaining (e.g., updating) a validity mapping by setting entries of an associated change log to indicate updates to multiple entries of the validity mapping. For example, a memory system may receive a command associated with data having a corresponding set of addresses (whether physical addresses or logical block addresses). In response to receiving the command, the memory system may identify whether the set of addresses (e.g., or a subset of the set of addresses) are consecutive. If the set (e.g., or the subset) of addresses are consecutive, the memory system may set a flag in an entry of the change log (e.g., add the entry to the change log with the flag set) to indicate that the set of addresses are consecutive. Additionally, the memory system may set a first field of the entry of the change log to indicate a quantity of addresses included in the set of consecutive addresses and may set a second field to indicate a starting address of the set of consecutive addresses. In this way, the entry of the change log may indicate updates to multiple entries of the validity mapping that are associated with the set of consecutive addresses. For example, the memory system may use the entry of the change log to determine and update an entry of the validity mapping corresponding to the starting address and entries of the validity mapping corresponding to subsequent consecutive addresses included in the set. Alternatively, if one or more addresses of the set of addresses are non-consecutive, the memory system may add an entry to the change log for each non-consecutive address with a respective flag set to indicate that the address is non-consecutive with other addresses of the set of addresses.

Features of the disclosure are initially described in the context of systems as described with reference to FIG. 1. Features of the disclosure are described in the context of an entry diagram and a process flow as described with reference to FIGS. 2-3. These and other features of the disclosure are further illustrated by and described in the context of an apparatus diagram and a flowchart that relate to validity mapping techniques with reference to FIGS. 4-5.

FIG. 1 illustrates an example of a system 100 that supports validity mapping techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new; valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The memory device 130 (e.g., the local controller 135) or the memory system controller 115 may track which pages 175 contain valid data or invalid data using a validity mapping. The validity mapping may include entries that each indicate whether a corresponding page 175 contains valid data or invalid data. For example, an entry of the validity mapping may be indexed using an LBA or a physical address of a corresponding page 175 and one or more bits that indicate whether data stored at the corresponding page 175 is valid (or both an LBA and a physical address). To update the validity mapping, the memory device 130 or the memory system controller 115 may use a change log in which entries of the change log indicate updates to corresponding entries of the validity mapping. The memory device 130 or the memory system controller 115 may use the change log in order to group updates to the validity mapping.

The host system 105 may transmit (e.g., via the host system controller 106) a command to the memory system 110 (e.g., to the memory system controller 115) that involves updating the validity mapping (e.g., a write command, an unmap command, or some other command). The memory system 110 (e.g., the memory system controller 115) may receive the command and identify whether a set of physical addresses associated with the command is a set of consecutive physical addresses (e.g., or includes a subset). If the set (e.g., or the subset) of physical addresses are consecutive, the memory system 110 may set a flag in an entry of the change log (e.g., add the entry to the change log with the flag set) to indicate that the set of physical addresses are consecutive. Additionally, the memory system 110 may set a first field of the entry of the change log to indicate a quantity of physical addresses included in the set of consecutive physical addresses and may set a second field to indicate a starting physical address of the set of consecutive physical addresses. The memory system 110 may use the entry of the change log to determine and update an entry of the validity mapping corresponding to the starting physical address and entries of the validity mapping corresponding to subsequent consecutive physical addresses included in the set. Alternatively, if one or more physical addresses of the set of physical addresses are non-consecutive, the memory system 110 may add an entry to the change log for each non-consecutive physical address with a respective flag set to indicate that the physical address is non-consecutive with other physical addresses of the set of physical addresses.

The system 100 may include any quantity of non-transitory computer readable media that support validity mapping techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory array's and related circuitry combined with a local (e.g., on-die or in-package) controller (e.g., local controller 135). An example of a managed memory system is a managed NAND (MNAND) system.

Figure 2:
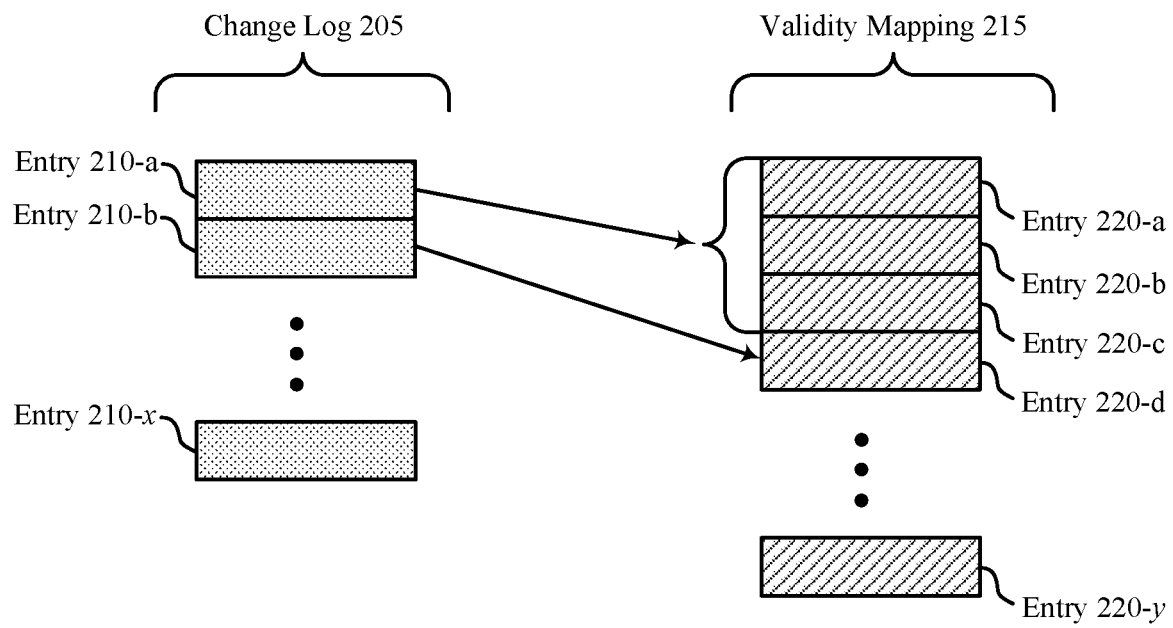
FIG. 2 illustrates an example of an entry diagram that supports validity mapping techniques in accordance with examples as disclosed herein.
Figure 2:
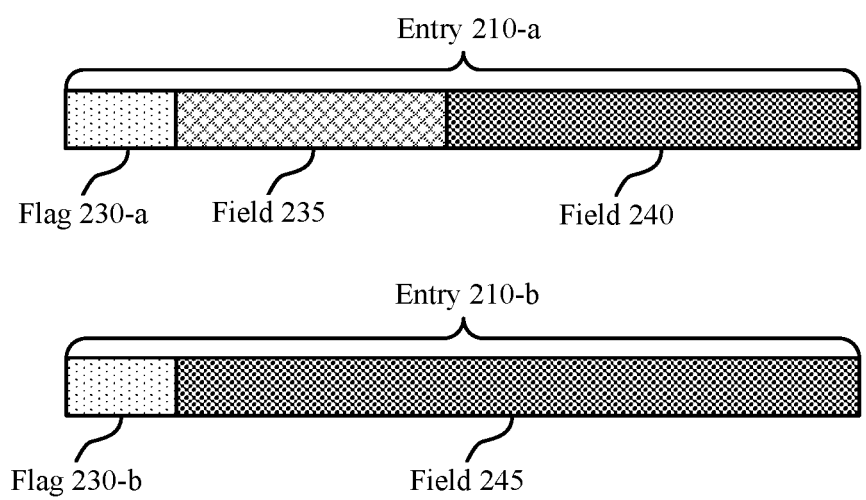

FIG. 2 illustrates an example of an entry diagram 200 that supports validity mapping techniques in accordance with examples as disclosed herein. The entry diagram 200 may implement aspects of a system 100, as described with reference to FIG. 1. For example, the entry diagram 200 may be implemented by a controller, such as a memory system controller 115 or a local controller 135, or a memory device, such as a memory device 130, or both, as described with reference to FIG. 1. The entry diagram 200 may be implemented to reduce latency and power consumption and increase performance of a memory system, among other benefits.

The entry diagram 200 depicts a validity mapping 215 which may be generated, maintained, and used by the controller to determine whether data stored at physical addresses of a memory device (e.g., a memory device 130) is valid. For example, the validity mapping 215 may include a quantity of entries 220. In some examples, each entry 220 may correspond to (e.g., include) a particular physical address of the memory device such as a physical address of a memory cell of the memory device, a physical row address, or a physical address of a page (e.g., a page 175) of the memory device, among other physical addresses. Each entry 220 may additionally indicate (e.g., via a bit of the entry 220) whether data stored at the physical address is valid. For example, if the bit of a respective entry 220 associated with indicating data validity is a '1', the controller may determine that the data stored at the physical address is valid, or vice versa. In some examples, each entry 220 may correspond to a particular logical block address. In such examples, the features related to creating, reading, updating, or deleting entries of the validity mapping 215 that is associated with physical address may also be applied to a validity mapping associated with logical block addresses.

The validity mapping 215 may include any quantity of entries 220. For example, the validity mapping 215 may include entry 220-*a* through entry 220-*y*, where y is any positive integer.

The controller may update the entries 220 of the validity mapping 215 in response to various commands. For example, in response to receiving a write command, the controller may write data to one or more physical addresses and may update corresponding entries 220 to indicate that the one or more physical addresses store valid data. Additionally, or alternatively, some other commands may be associated with marking data stored at one or more physical addresses as invalid (e.g., unmap commands to cause the validity mapping to indicate that the one or more addresses store invalid data, wear-leveling commands, garbage collect commands, among others), and the controller may update corresponding entries 220 to indicate that the one or more physical addresses store invalid data.

To update the entries 220, the controller may transfer portions of the validity mapping 215 from a non-volatile memory device (e.g., a memory device 130 that includes non-volatile memory cells, a NAND device) to a volatile memory device (e.g., local memory 120, a memory device 130 that includes volatile memory cells, an SRAM device). For example, the volatile memory device may be associated with faster operations relative to the non-volatile memory device, and the non-volatile memory device may be associated with larger storage capacity relative to the volatile memory device. Accordingly, the controller may store the validity mapping 215 in the non-volatile memory device and may transfer portions of the validity mapping 215 to and from the volatile memory device to update entries 220 of the validity mapping 215.

Reducing a quantity of times that portions of the validity mapping 215 are transferred between the non-volatile memory device and the volatile memory device may reduce latency associated with updating the validity mapping 215. Accordingly, the controller may use a change log 205 stored in the volatile memory device to group updates to the validity mapping 215, thereby reducing the quantity of times the portions of the validity mapping 215 are transferred. For example, the controller may receive a command that involves updating a set of entries 220 corresponding to a set of physical addresses associated with the command (e.g., a write command, an unmap command, or some other command). Rather than individually transfer each entry 220 to and from the volatile memory device to update each entry 220, in some cases, the controller may add a set of entries 210 to the change log 205, each entry 210 indicating an update to a corresponding entry 220. Then, controller may transfer, to the volatile memory device, a portion of the validity mapping 215 that includes at least some of the set of entries 220, update the entries 220 included in the portion according to the updates indicated by the entries 210, and transfer the portion to the non-volatile memory device. The controller may erase, from the change log 205, the set of entries 210 whose corresponding entries 220 were updated and may repeat this process until each of the entries 220 of the set of entries 220 is updated.

In this way, the controller may update multiple entries 220 in one transfer of a portion of the validity mapping 215 to and from the volatile memory device by using the change log 205. However, in some cases, the change log 205 may have size restrictions, which may limit a quantity of entries 210 that may be included in the change log 205 and, by extension, a quantity of updates to the validity mapping 215 that may be grouped by the change log 205. Accordingly, techniques to increase a quantity of updates to the validity mapping 215 that may be grouped by the change log 205 may reduce latency and increase performance associated with updating validity mappings.

In some examples, the change log 205 may have a size which may accommodate a quantity of entries 210. For example, the change log 205 may include entry 210-*a* up to entry 210-*x*, where x is some positive integer corresponding to the size of the change log 205. However, the controller may increase a quantity of updates to entries 220 indicated by the change log 205 by setting an entry 210 to indicate updates to multiple entries 220. For example, the controller may receive (e.g., from a host system) a command associated with data having a corresponding set of physical addresses. The controller may identify whether the set of physical addresses is a set (e.g., or includes a subset) of consecutive physical addresses. If the set (or the subset) of physical addresses are consecutive, the controller may set an entry 210 (e.g., add the entry 210 that is set) to correspond to the set (or the subset) of consecutive physical addresses (e.g., rather than to a single physical address).

For example, the controller may set a flag 230 in an entry 210 to indicate that the entry 210 corresponds to a set of consecutive physical addresses. If the flag 230 indicates that the addresses are consecutive, the corresponding entry 210) may include a first set of information or fields, as shown in entry 210-a. If the flag 230 indicates that the addresses are not consecutive, the corresponding entry may include a second set of information or fields, as shown in entry 210-b. In the example of FIG. 2, the controller may set a flag 230-a in the entry 210-a to indicate that the entry 210-a corresponds to a set of consecutive physical addresses. In order to indicate the corresponding set of consecutive physical addresses, the controller may set fields of the entry 210-a. For example, the controller may set a field 235 of the entry 210-a to indicate a quantity of physical addresses that are included in the set of consecutive physical addresses. For example, if the set (or subset) of consecutive physical addresses includes three consecutive physical addresses corresponding to the entries 220-a, 220-b, and 220-c, the controller may set the field 235 to indicate that the three physical addresses are included in the set of consecutive physical addresses. In some examples, the field 235 corresponds to a first set of bits of the entry 210-a. In some cases, the field 235 is associated with bits of an entry 210 that indicate a virtual block in which the set of physical addresses is located. Additionally, the controller may set a field 240 of the entry 210-a to indicate a starting physical address of the set of consecutive physical addresses. For example, the controller may set the field 240 to indicate the physical address corresponding to entry 220-a. In some examples, the field 240 corresponds to a second set of bits of the entry 210-a.

By setting the flag 230-a, the field 235, and the field 240 in this way, the controller may set the entry 210-a to indicate whether respective data stored at the physical addresses corresponding to the entries 220-a, 220-b, and 220-c is valid. For example, if updating the validity mapping 215, the controller may read the entry 210-a. Because the flag 230-a indicates that the entry 210-a corresponds to a set of consecutive physical addresses, the controller may determine that the field 235 corresponds to the quantity of physical addresses included in the set (or subset) of consecutive physical addresses and that the field 240) corresponds to the starting physical address of the set (or subset) of consecutive physical addresses. The controller may determine the entry 220 corresponding to the starting physical address (e.g., the entry 220-a) and may update the entry 220-a to indicate whether the corresponding physical address stores valid data based on the command. Additionally, in the example of FIG. 2, the field 235 indicates that the set of consecutive physical addresses includes three physical addresses. Accordingly, the controller may determine the entries 220 corresponding to next two consecutive physical addresses after the starting physical address (e.g., the entry 220-b and the entry 220-c) and may update the entry 220-b and the entry 220-c based on the command. Therefore, the controller may set an entry 210 to indicate updates to multiple entries 220, thereby increasing a quantity of updates to the validity mapping 215 that may be grouped by the change log 205.

For illustrative purposes, FIG. 2 depicts the entry 210-a as indicating updates to three entries 220. Entry 210-a, however, may be adapted and applied for an entry 210 to indicate updates to any quantity of entries 220 (e.g., one, two, three four, five, six, seven, eight, sixteen, thirty-two, sixty-four, etc.).

Alternatively, if a physical addresses of the set of physical addresses associated with the command is non-consecutive with other physical addresses of the set of physical addresses, the controller may add an entry 210 to the change log 205 that corresponds to the non-consecutive physical address. For example, if the physical address corresponding to entry 220-d is a non-consecutive physical address of the set of physical addresses, the controller may add and set an entry 210-b. The controller may set a flag 230-b in the entry 210-b to indicate that the entry 210-b corresponds to a non-consecutive physical address. Additionally, the controller may set the field 245 to indicate the non-consecutive physical address. Accordingly, if updating the validity mapping 215, the controller may read the entry 210-b, determine that the entry 210-b corresponds to a non-consecutive physical address based on the flag 230-b, determine the entry 220 corresponding to the non-consecutive physical address indicated by the field 245 (e.g., the entry 220-d), and update the entry 220-d to indicate whether the non-consecutive physical address stores valid data based on the command.

Figure 3:
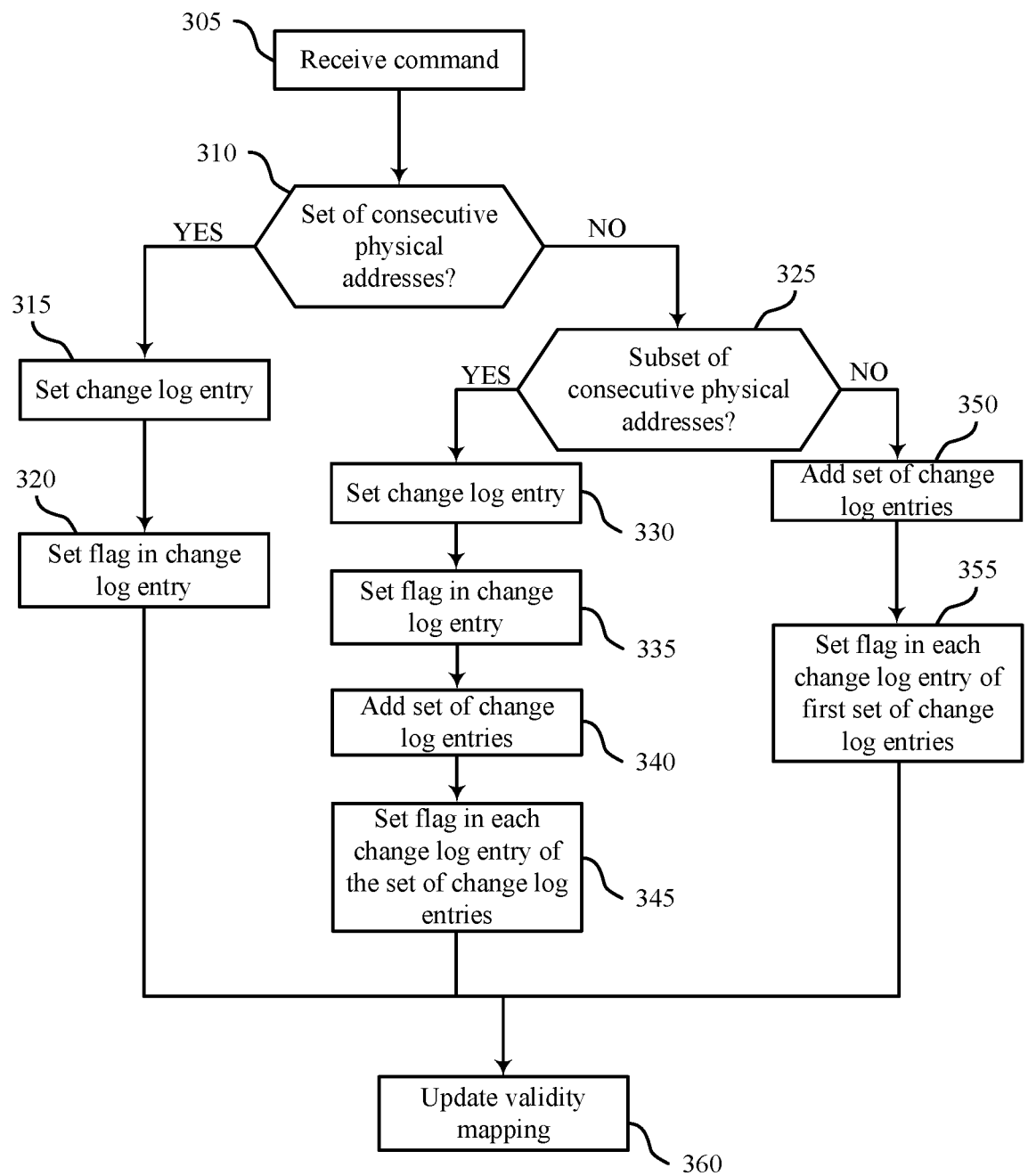
FIG. 3 illustrates an example of a process flow that supports validity mapping techniques in accordance with examples as disclosed herein.

FIG. 3 illustrates an example of a process flow 300 that supports validity mapping techniques in accordance with examples as disclosed herein. Process flow 300 may be performed by components of a memory system, such as memory system 110 described with reference to FIG. 1. For example, process flow 300 may be performed by a controller of a memory system or a memory device (or both) such as a memory system controller 115 or a local controller 135 as described with reference to FIG. 1. Process flow 300 may depict a process for updating a validity mapping based on whether physical addresses associated with a command are consecutive that may be implemented to reduce latency and power consumption and increase system performance, among other benefits. Aspects of the process flow 300 may be implemented by a controller, among other components. Additionally or alternatively, aspects of the process flow 300 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 300.

In the following description of the process flow 300, the operations may be performed in different orders or at different times. Some operations may also be omitted from the process flow 300, and other operations may be added to the process flow 300.

At 305, a command associated with data having a corresponding set of physical addresses may be received. For example, the controller may receive a command associated with the data from a host system. Examples of the command may include a write command, an unmap command, a wear leveling command, a garbage collect command, or some other command that involves updating a validity mapping maintained by the controller.

At 310, the set of physical addresses may be evaluated as to whether it is a set of consecutive physical addresses. For example, in response to receiving the command, the controller may identify whether one or more physical addresses of the set are non-consecutive with other physical addresses of the set. If, at 310, the controller identifies that the physical addresses of the set are consecutive (e.g., consecutively indexed), the controller may perform 315 through 320 and 360, as follows.

At 315, an entry of a change log associated with the validity mapping may be set to indicate an update to a set of entries of the validity mapping. For example, in response to identifying that the physical addresses of the set are consecutive, the controller may set a first field of the change log entry and a second field of the change log entry. The controller may set the first field to indicate a quantity of physical addresses included in the set. The controller may set the second field to indicate (e.g., include) a starting physical address of the set (e.g., the first physical address of the set). In some examples, the controller may add the change log entry to the change log with the first field and second field set accordingly.

At 320, a flag in the change log entry may be set to indicate that the set of physical addresses are consecutive. For example, in response to identifying that the physical addresses of the set are consecutive, the controller may set the flag to indicate that the change log entry corresponds to a set of consecutive physical addresses. Accordingly, the flag may indicate to the controller that the first field corresponds to the quantity of physical addresses included in the set and the second field corresponds to the starting physical address.

If, at 310, the controller identifies that one or more of the physical addresses of the set are non-consecutive, at 325, the controller may identify whether one or more subsets of physical addresses of the set are consecutive. If, at 325, the controller identifies one or more subsets of consecutive physical addresses of the set, the controller may perform 330 through 345 and 360, as follows.

At 330, an entry of the change log may be set to indicate an update to a set of entries of the validity mapping corresponding to a subset of consecutive physical addresses. For example, in response to identifying the one or more subsets of consecutive physical addresses, the controller may set a change log entry for each of the one or more subsets of consecutive physical addresses. The controller may set a first field of each respective change log entry to indicate a respective quantity of physical addresses included in the respective subset of consecutive physical addresses. The controller may set a second field of each respective change log entry to indicate a respective starting physical address of the respective subset of consecutive physical addresses.

At 335, a flag in each respective change log entry may be set. For example, the controller may set the flag in each respective change log entry to indicate to indicate that the change log entry corresponds to a set of consecutive physical addresses. Accordingly, the flag may indicate that the first field of each respective change log entry corresponds to the respective quantity of physical addresses included in the respective subset of consecutive physical addresses and the second field of each respective change log entry corresponds to the respective starting physical address of the respective subset of consecutive physical addresses.

At 340, a set of entries corresponding to non-consecutive physical addresses of the set may be added to the change log. For example, in response to identifying that one or more physical addresses of the set are non-consecutive, the controller may add a set of change log entries to the change log, where each change log entry of the set of change log entries corresponds to a non-consecutive physical address of the set. In some examples, the controller may set each change log entry of the set of change log entries to indicate an update to a single entry of a validity mapping associated with the corresponding non-consecutive physical address.

At 345, a flag in each change log entry of the set of change log entries may be set. For example, the controller may set the flag in each change log entry of the set of change log entries to indicate that the change log entry corresponds to a non-consecutive physical address. Accordingly, the flag may indicate that a respective change log entry of the set of change log entries indicates an update to a single entry of the validity mapping.

If, at 325, the controller does not identify one or more subsets of consecutive physical addresses, the controller may perform 350 through 360, as follows. For example, if the controller identifies that the physical addresses of the set are non-consecutive, the controller may perform 350 through 360, as follows.

At 350, a set of entries corresponding to the set of non-consecutive physical addresses may be added. For example, in response to identifying that the physical addresses of the set are non-consecutive, the controller may add a set of change log entries to the change log, each change log entry corresponding to one physical address of the set. In some examples, the controller may set each change log entry to indicate an update to a single entry of a validity mapping associated with the corresponding physical address.

At 355, a flag in each change log entry may be set. For example, the controller may set the flag in each change log entry to indicate that the change log entry corresponds to a non-consecutive physical address. Accordingly, the flag may indicate that a respective change log entry indicates an update to a single entry of the validity mapping.

At 360, the validity mapping may be updated. For example, the controller may update the validity mapping according the change log entries included in the change log. For each change log entry included in the change log, the controller may read the flag to determine whether the change log entry corresponds to a set of consecutive physical addresses or a non-consecutive physical address. If the flag indicates that the change log entry corresponds to a set of consecutive physical addresses, the controller may read the first field and the second field to identify and update the corresponding entries of the validity mapping. Alternatively, if the flag indicates that the change log entry corresponds to a non-consecutive physical address, the controller may identify and update the corresponding entry of the validity mapping.

Figure 4:
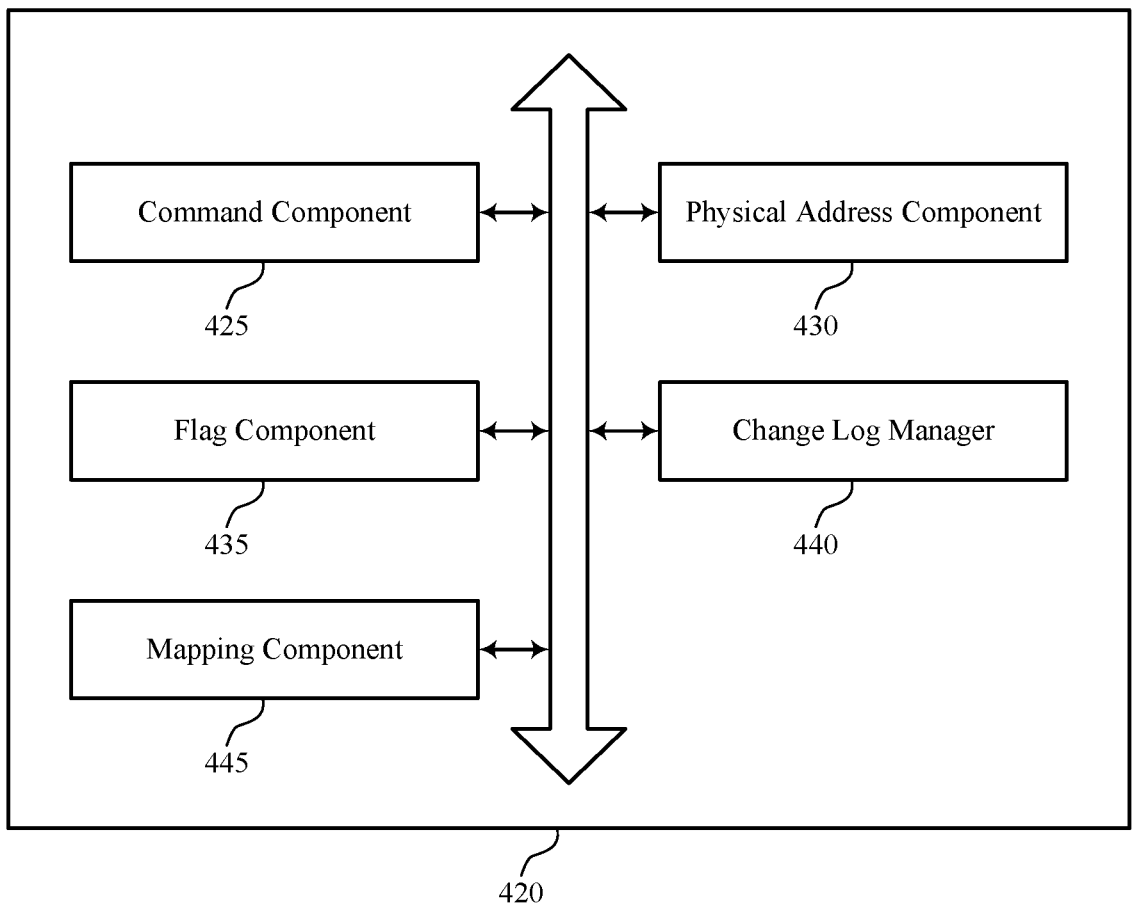
FIG. 4 shows a block diagram of a memory system that supports validity mapping techniques in accordance with examples as disclosed herein.

FIG. 4 shows a block diagram 400 of a memory system 420 that supports validity mapping techniques in accordance with examples as disclosed herein. The memory system 420 may be an example of aspects of a memory system as described with reference to FIGS. 1 through 3. The memory system 420, or various components thereof, may be an example of means for performing various aspects of validity mapping techniques as described herein. For example, the memory system 420 may include a command component 425, a physical address component 430, a flag component 435, a change log manager 440, a mapping component 445, or any combination thereof. Each of these components may communicate, directly or indirectly, with one another (e.g., via one or more buses).

The command component 425 may be configured as or otherwise support a means for receiving a command associated with data having a corresponding set of physical addresses. The physical address component 430 may be configured as or otherwise support a means for identifying whether the set of physical addresses is a set of consecutive physical addresses. The flag component 435 may be configured as or otherwise support a means for setting a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid.

In some examples, the change log manager 440 may be configured as or otherwise support a means for setting the entry of the change log to indicate an update to a set of entries of the mapping based at least in part on identifying that the physical addresses of the set of physical addresses are consecutive.

In some examples, to support setting the entry of the change log, the change log manager 440 may be configured as or otherwise support a means for setting a first field of the entry of the change log to indicate a quantity of physical addresses included in the set of physical addresses. In some examples, to support setting the entry of the change log, the change log manager 440 may be configured as or otherwise support a means for setting a second field of the entry of the change log to indicate a starting physical address of the set of physical addresses that are consecutive.

In some examples, the mapping component 445 may be configured as or otherwise support a means for transferring, from a non-volatile memory device of the memory system to a volatile memory device of the memory system, a portion of the mapping that includes the set of entries of the mapping based at least in part on setting the flag in the entry of the change log. In some examples, the mapping component 445 may be configured as or otherwise support a means for updating each entry of the set of entries of the mapping to indicate whether a corresponding physical address stores valid data based at least in part on the entry of the change log.

In some examples, each entry of the set of entries of the mapping is associated with a physical address of the set of physical addresses.

In some examples, the change log manager 440 may be configured as or otherwise support a means for adding a set of entries to the change log including the entry of the change log based at least in part on identifying that the physical addresses of the set of physical addresses are non-consecutive, each entry of the set of entries of the change log corresponding to a physical address of the set of physical addresses. In some examples, the flag component 435 may be configured as or otherwise support a means for setting, in each entry of the set of entries of the change log, a respective flag to indicate that a corresponding physical address is non-consecutive with other physical addresses of the set of physical addresses based at least in part on identifying that the physical addresses of the set of physical addresses are non-consecutive.

In some examples, the mapping component 445 may be configured as or otherwise support a means for updating, for each entry of the set of entries of the change log, a corresponding entry of the mapping to indicate whether the corresponding physical address stores valid data based at least in part on setting the respective flag.

In some examples, the physical address component 430 may be configured as or otherwise support a means for identifying that a first subset of physical addresses of the set of physical addresses are consecutive and that a second subset of physical addresses of the set of physical addresses are non-consecutive, where the entry of the change log is associated with the first subset of physical addresses. In some examples, the change log manager 440 may be configured as or otherwise support a means for adding a first set of entries to the change log for the second subset of physical addresses that are non-consecutive based at least in part on identifying that the second subset of physical addresses of the set of physical addresses are non-consecutive. In some examples, the flag component 435 may be configured as or otherwise support a means for setting, in each entry of the first set of entries of the change log, a respective flag to indicate that the second subset of physical addresses are non-consecutive.

In some examples, the entry of the change log corresponds to a set of entries of the mapping, a quantity of physical addresses of the first subset of physical addresses equal to a quantity of entries of the set of entries of the mapping. In some examples, each entry of the first set of entries of the change log corresponds to an entry of the mapping.

In some examples, the mapping component 445 may be configured as or otherwise support a means for updating each entry of set of entries of the mapping to indicate whether a corresponding physical address of the first subset of physical addresses stores valid data based at least in part on the entry of the change log. In some examples, the mapping component 445 may be configured as or otherwise support a means for updating, for each entry of the first set of entries of the change log, the corresponding entry of the mapping to indicate whether a corresponding physical address of the second subset of physical addresses stores valid data.

In some examples, the command is an unmap command or a write command. In some examples, an entry of the mapping indicates whether data stored at a corresponding physical address is valid.

Figure 5:
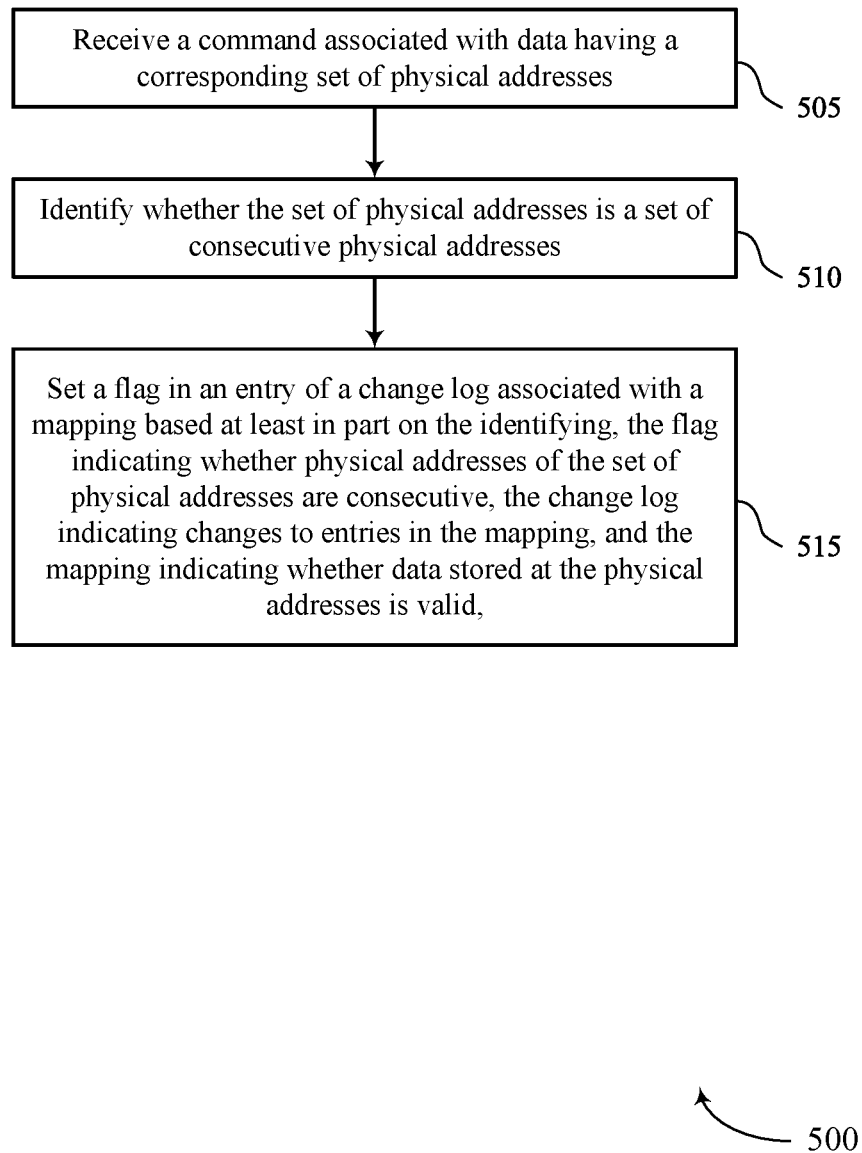
FIG. 5 shows a flowchart illustrating a method or methods that support validity mapping techniques in accordance with examples as disclosed herein.

FIG. 5 shows a flowchart illustrating a method 500 that supports validity mapping techniques in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally or alternatively, the memory system may perform aspects of the described functions using special-purpose hardware.

At 505, the method may include receiving a command associated with data having a corresponding set of physical addresses. The operations of 505 may be performed in accordance with examples as disclosed herein. In some examples, aspects of the operations of 505 may be performed by a command component 425 as described with reference to FIG. 4.

At 510, the method may include identifying whether the set of physical addresses is a set of consecutive physical addresses. The operations of 510 may be performed in accordance with examples as disclosed herein. In some examples, aspects of the operations of 510 may be performed by a physical address component 430 as described with reference to FIG. 4.

At 515, the method may include setting a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid. The operations of 515 may be performed in accordance with examples as disclosed herein. In some examples, aspects of the operations of 515 may be performed by a flag component 435 as described with reference to FIG. 4.

In some examples, an apparatus as described herein may perform a method or methods, such as the method 500. The apparatus may include, features, circuitry, logic, means, or instructions (e.g., a non-transitory computer-readable medium storing instructions executable by a processor) for receiving a command associated with data having a corresponding set of physical addresses, identifying whether the set of physical addresses is a set of consecutive physical addresses, and setting a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid.

Some examples of the method 500 and the apparatus described herein may further include operations, features, circuitry, logic, means, or instructions for setting the entry of the change log to indicate an update to a set of entries of the mapping based at least in part on identifying that the physical addresses of the set of physical addresses may be consecutive.

In some examples of the method 500 and the apparatus described herein, setting the entry of the change log may include operations, features, circuitry, logic, means, or instructions for setting a first field of the entry of the change log to indicate a quantity of physical addresses included in the set of physical addresses and setting a second field of the entry of the change log to indicate a starting physical address of the set of physical addresses that may be consecutive.

Some examples of the method 500 and the apparatus described herein may further include operations, features, circuitry, logic, means, or instructions for transferring, from a non-volatile memory device of the memory system to a volatile memory device of the memory system, a portion of the mapping that includes the set of entries of the mapping based at least in part on setting the flag in the entry of the change log and updating each entry of the set of entries of the mapping to indicate whether a corresponding physical address stores valid data based at least in part on the entry of the change log.

In some examples of the method 500 and the apparatus described herein, each entry of the set of entries of the mapping may be associated with a physical address of the set of physical addresses.

Some examples of the method 500 and the apparatus described herein may further include operations, features, circuitry, logic, means, or instructions for adding a set of entries to the change log including the entry of the change log based at least in part on identifying that the physical addresses of the set of physical addresses may be non-consecutive, each entry of the set of entries of the change log corresponding to a physical address of the set of physical addresses and setting, in each entry of the set of entries of the change log, a respective flag to indicate that a corresponding physical address may be non-consecutive with other physical addresses of the set of physical addresses based at least in part on identifying that the physical addresses of the set of physical addresses may be non-consecutive.

Some examples of the method 500 and the apparatus described herein may further include operations, features, circuitry, logic, means, or instructions for updating, for each entry of the set of entries of the change log, a corresponding entry of the mapping to indicate whether the corresponding physical address stores valid data based at least in part on setting the respective flag.

Some examples of the method 500 and the apparatus described herein may further include operations, features, circuitry, logic, means, or instructions for identifying that a first subset of physical addresses of the set of physical addresses may be consecutive and that a second subset of physical addresses of the set of physical addresses may be non-consecutive, where the entry of the change log may be associated with the first subset of physical addresses, adding a first set of entries to the change log for the second subset of physical addresses that may be non-consecutive based at least in part on identifying that the second subset of physical addresses of the set of physical addresses may be non-consecutive, and setting, in each entry of the first set of entries of the change log, a respective flag to indicate that the second subset of physical addresses may be non-consecutive.

In some examples of the method 500 and the apparatus described herein, the entry of the change log corresponds to a set of entries of the mapping, where a quantity of physical addresses of the first subset of physical addresses is equal to a quantity of entries of the set of entries of the mapping. In some examples of the method 500 and the apparatus described herein, each entry of the first set of entries of the change log corresponds to an entry of the mapping.

Some examples of the method 500 and the apparatus described herein may further include operations, features, circuitry, logic, means, or instructions for updating each entry of set of entries of the mapping to indicate whether a corresponding physical address of the first subset of physical addresses stores valid data based at least in part on the entry of the change log and updating, for each entry of the first set of entries of the change log, the corresponding entry of the mapping to indicate whether a corresponding physical address of the second subset of physical addresses stores valid data.

In some examples of the method 500 and the apparatus described herein, the command may be an unmap command or a write command. In some examples of the method 500 and the apparatus described herein, an entry of the mapping indicates whether data stored at a corresponding physical address may be valid.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device and a controller coupled with the memory device and operable to cause the apparatus to receive a command associated with data having a corresponding set of physical addresses, identify whether the set of physical addresses is a set of consecutive physical addresses, and set a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid.

In some examples of the apparatus, the controller may be further configured to cause the apparatus to set the entry of the change log to indicate an update to a set of entries of the mapping based at least in part on identifying that the physical addresses of the set of physical addresses may be consecutive.

In some examples of the apparatus, to set the entry of the change log, the controller may be further configured to cause the apparatus to set a first field of the entry of the change log to indicate a quantity of physical addresses included in the set of physical addresses and set a second field of the entry of the change log to indicate a starting physical address of the set of physical addresses that may be consecutive.

In some examples of the apparatus, the controller may be further configured to cause the apparatus to transfer, from a non-volatile memory device to a volatile memory device, a portion of the mapping that includes the set of entries of the mapping based at least in part on setting the flag in the entry of the change log and update each entry of the set of entries of the mapping to indicate whether a corresponding physical address stores valid data based at least in part on the entry of the change log.

In some examples of the apparatus, each entry of the set of entries of the mapping may be associated with a physical address of the set of physical addresses.

In some examples of the apparatus, the controller may be further configured to cause the apparatus to add a set of entries to the change log including the entry of the change log based at least in part on identifying that the physical addresses of the set of physical addresses may be non-consecutive, each entry of the set of entries of the change log corresponding to a physical address of the set of physical addresses and set, in each entry of the set of entries of the change log, a respective flag to indicate that a corresponding physical address may be non-consecutive with other physical addresses of the set of physical addresses based at least in part on identifying that the physical addresses of the set of physical addresses may be non-consecutive.

In some examples of the apparatus, the controller may be further configured to cause the apparatus to update, for each entry of the set of entries of the change log, a corresponding entry of the mapping to indicate whether the corresponding physical address stores valid data based at least in part on setting the respective flag.

In some examples of the apparatus, the controller may be further configured to cause the apparatus to identify that a first subset of physical addresses of the set of physical addresses may be consecutive and that a second subset of physical addresses of the set of physical addresses may be non-consecutive, where the entry of the change log may be associated with the first subset of physical addresses, add a first set of entries to the change log for the second subset of physical addresses that may be non-consecutive based at least in part on identifying that the second subset of physical addresses of the set of physical addresses may be non-consecutive, and set, in each entry of the first set of entries of the change log, a respective flag to indicate that the second subset of physical addresses may be non-consecutive.

In some examples of the apparatus, the entry of the change log corresponds to a set of entries of the mapping, a quantity of physical addresses of the first subset of physical addresses equal to a quantity of entries of the set of entries of the mapping and each entry of the first set of entries of the change log corresponds to an entry of the mapping.

In some examples of the apparatus, the controller may be further configured to cause the apparatus to update each entry of set of entries of the mapping to indicate whether a corresponding physical address of the first subset of physical addresses stores valid data based at least in part on the entry of the change log and update, for each entry of the first set of entries of the change log, the corresponding entry of the mapping to indicate whether a corresponding physical address of the second subset of physical addresses stores valid data.

In some examples of the apparatus, the command may be an unmap command or a write command. In some examples of the apparatus, an entry of the mapping indicates whether data stored at a corresponding physical address may be valid.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow:

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and operable to cause the memory system to:
receive a command associated with data having a corresponding set of physical addresses;
identify whether the set of physical addresses is a set of consecutive physical addresses; and
set a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid, wherein an entry of the mapping indicates whether data stored at a corresponding physical address is valid.

2. A memory system, comprising:
one or more memory devices; and
processing circuitry coupled with the one or more memory devices and operable to cause the memory system to:
receive a command associated with data having a corresponding set of physical addresses;
identify whether the set of physical addresses is a set of consecutive physical addresses;
set a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid; and
set the entry of the change log to indicate an update to a set of entries of the mapping based at least in part on identifying that the physical addresses of the set of physical addresses are consecutive.

3. The memory system of claim 2, wherein, to set the entry of the change log, the processing circuitry is further configured to cause the memory system to:
set a first field of the entry of the change log to indicate a quantity of physical addresses included in the set of physical addresses; and
set a second field of the entry of the change log to indicate a starting physical address of the set of physical addresses that are consecutive.

4. The memory system of claim 2, wherein the processing circuitry is further configured to cause the memory system to:
transfer, from a non-volatile memory device to a volatile memory device, a portion of the mapping that comprises the set of entries of the mapping based at least in part on setting the flag in the entry of the change log; and
update each entry of the set of entries of the mapping to indicate whether a corresponding physical address stores valid data based at least in part on the entry of the change log.

5. The memory system of claim 2, wherein each entry of the set of entries of the mapping is associated with a physical address of the set of physical addresses.

6. A memory system, comprising:
one or more memory devices; and
processing circuitry coupled with the one or more memory devices and operable to cause the memory system to:
receive a command associated with data having a corresponding set of physical addresses;
identify whether the set of physical addresses is a set of consecutive physical addresses;
add a set of entries to a change log associated with a mapping based at least in part on identifying that the physical addresses of the set of physical addresses are non-consecutive, each entry of the set of entries of the change log corresponding to a physical address of the set of physical addresses, the change log indicating changes to entries in the mapping, and the mapping indicating whether data stored at the physical addresses is valid; and
set, in each entry of the set of entries of the change log, a respective flag indicating whether physical addresses of the set of physical addresses are consecutive, wherein the respective flags are set to indicate that a corresponding physical address is non-consecutive with other physical addresses of the set of physical addresses based at least in part on identifying that the physical addresses of the set of physical addresses are non-consecutive.

7. The memory system of claim 6, wherein the processing circuitry is further configured to cause the memory system to:
update, for each entry of the set of entries of the change log, a corresponding entry of the mapping to indicate whether the corresponding physical address stores valid data based at least in part on setting the respective flag.

8. A memory system, comprising:
one or more memory devices; and
processing circuitry coupled with the one or more memory devices and operable to cause the memory system to:
receive a command associated with data having a corresponding set of physical addresses;

identify whether the set of physical addresses is a set of consecutive physical addresses;
identify that a first subset of physical addresses of the set of physical addresses are consecutive and that a second subset of physical addresses of the set of physical addresses are non-consecutive;
set a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid, wherein the entry of the change log is associated with the first subset of physical addresses;
add a first set of entries to the change log for the second subset of physical addresses that are non-consecutive based at least in part on identifying that the second subset of physical addresses of the set of physical addresses are non-consecutive; and
set, in each entry of the first set of entries of the change log, a respective flag to indicate that the second subset of physical addresses are non-consecutive.

9. The memory system of claim 8, wherein:
the entry of the change log corresponds to a set of entries of the mapping, a quantity of physical addresses of the first subset of physical addresses equal to a quantity of entries of the set of entries of the mapping; and
each entry of the first set of entries of the change log corresponds to an entry of the mapping.

10. The memory system of claim 9, wherein the processing circuitry is further configured to cause the memory system to:
update each entry of set of entries of the mapping to indicate whether a corresponding physical address of the first subset of physical addresses stores valid data based at least in part on the entry of the change log; and
update, for each entry of the first set of entries of the change log, the corresponding entry of the mapping to indicate whether a corresponding physical address of the second subset of physical addresses stores valid data.

11. The memory system of claim 1, wherein the command is an unmap command or a write command.

12. A non-transitory computer-readable medium storing code comprising instructions which, when executed by processing circuitry of an electronic device, cause the electronic device to:
receive a command associated with data having a corresponding set of physical addresses;
identify whether the set of physical addresses is a set of consecutive physical addresses; and
set a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid, wherein an entry of the mapping indicates whether data stored at a corresponding physical address is valid.

13. A non-transitory computer-readable medium storing code comprising instructions which, when executed by processing circuitry of an electronic device, cause the electronic device to:
receive a command associated with data having a corresponding set of physical addresses;
identify whether the set of physical addresses is a set of consecutive physical addresses;
set a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid; and
set the entry of the change log to indicate an update to a set of entries of the mapping based at least in part on identifying that the physical addresses of the set of physical addresses are consecutive.

14. The non-transitory computer-readable medium of claim 13, wherein, to set the entry of the change log, the instructions, when executed by the processing circuitry of the electronic device, further cause the electronic device to:
set a first field of the entry of the change log to indicate a quantity of physical addresses included in the set of physical addresses; and
set a second field of the entry of the change log to indicate a starting physical address of the set of physical addresses that are consecutive.

15. The non-transitory computer-readable medium of claim 13, wherein the instructions, when executed by the processing circuitry of the electronic device, further cause the electronic device to:
transfer, from a non-volatile memory device to a volatile memory device, a portion of the mapping that comprises the set of entries of the mapping based at least in part on setting the flag in the entry of the change log; and
update each entry of the set of entries of the mapping to indicate whether a corresponding physical address stores valid data based at least in part on the entry of the change log.

16. A non-transitory computer-readable medium storing code comprising instructions which, when executed by processing circuitry of an electronic device, cause the electronic device to:
receive a command associated with data having a corresponding set of physical addresses;
identify whether the set of physical addresses is a set of consecutive physical addresses;
add a set of entries to a change log associated with a mapping based at least in part on identifying that the physical addresses of the set of physical addresses are non-consecutive, each entry of the set of entries of the change log corresponding to a physical address of the set of physical addresses, the change log indicating changes to entries in the mapping, and the mapping indicating whether data stored at the physical addresses is valid; and
set, in each entry of the set of entries of the change log, a respective flag indicating whether physical addresses of the set of physical addresses are consecutive, wherein the respective flags are set to indicate that a corresponding physical address is non-consecutive with other physical addresses of the set of physical addresses based at least in part on identifying that the physical addresses of the set of physical addresses are non-consecutive.

17. The non-transitory computer-readable medium of claim 16, wherein the instructions, when executed by the processing circuitry of the electronic device, further cause the electronic device to:

update, for each entry of the set of entries of the change log, a corresponding entry of the mapping to indicate whether the corresponding physical address stores valid data based at least in part on setting the respective flag.

18. A non-transitory computer-readable medium storing code comprising instructions which, when executed by processing circuitry of an electronic device, cause the electronic device to:
receive a command associated with data having a corresponding set of physical addresses;
identify whether the set of physical addresses is a set of consecutive physical addresses;
identify that a first subset of physical addresses of the set of physical addresses are consecutive and that a second subset of physical addresses of the set of physical addresses are non-consecutive;
set a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid, wherein the entry of the change log is associated with the first subset of physical addresses;
add a first set of entries to the change log for the second subset of physical addresses that are non-consecutive based at least in part on identifying that the second subset of physical addresses of the set of physical addresses are non-consecutive; and
set, in each entry of the first set of entries of the change log, a respective flag to indicate that the second subset of physical addresses are non-consecutive.

19. The non-transitory computer-readable medium of claim 18, wherein:
the entry of the change log corresponds to a set of entries of the mapping, a quantity of physical addresses of the first subset of physical addresses equal to a quantity of entries of the set of entries of the mapping; and
each entry of the first set of entries of the change log corresponds to an entry of the mapping.

20. The non-transitory computer-readable medium of claim 19, wherein the instructions, when executed by the processing circuitry of the electronic device, further cause the electronic device to:
update each entry of set of entries of the mapping to indicate whether a corresponding physical address of the first subset of physical addresses stores valid data based at least in part on the entry of the change log; and
update, for each entry of the first set of entries of the change log, the corresponding entry of the mapping to indicate whether a corresponding physical address of the second subset of physical addresses stores valid data.

21. A method performed by a memory system, comprising:
receiving a command associated with data having a corresponding set of physical addresses;
identifying whether the set of physical addresses is a set of consecutive physical addresses; and
setting a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid, wherein an entry of the mapping indicates whether data stored at a corresponding physical address is valid.

22. A method performed by a memory system, comprising:
receiving a command associated with data having a corresponding set of physical addresses;
identifying whether the set of physical addresses is a set of consecutive physical addresses;
setting a flag in an entry of a change log associated with a mapping based at least in part on the identifying, the flag indicating whether physical addresses of the set of physical addresses are consecutive, the change log indicating changes to entries in the mapping, and the mapping indicating whether data stored at the physical addresses is valid; and
setting the entry of the change log to indicate an update to a set of entries of the mapping based at least in part on identifying that the physical addresses of the set of physical addresses are consecutive.

23. The method of claim 22, wherein setting the entry of the change log comprises:
setting a first field of the entry of the change log to indicate a quantity of physical addresses included in the set of physical addresses; and
setting a second field of the entry of the change log to indicate a starting physical address of the set of physical addresses that are consecutive.

24. The method of claim 22, further comprising:
transferring, from a non-volatile memory device of the memory system to a volatile memory device of the memory system, a portion of the mapping that comprises the set of entries of the mapping based at least in part on setting the flag in the entry of the change log; and
updating each entry of the set of entries of the mapping to indicate whether a corresponding physical address stores valid data based at least in part on the entry of the change log.

* * * * *